US008899902B2

(12) United States Patent
Herold

(10) Patent No.: US 8,899,902 B2
(45) Date of Patent: Dec. 2, 2014

(54) CONTAINER HANDLING SYSTEM COMPRISING A CRANE AND A PLURALITY OF BASE ELEMENTS WHICH CAN BE MOUNTED ON TOP OF CONTAINERS FOR SUPPORTING THE CRANE AND TRANSPORTING THE CONTAINERS

(76) Inventor: Jens-Christian Herold, Vanløse (DK)

(*) Notice: Subject to any disclaimer, the term of this patent is extended or adjusted under 35 U.S.C. 154(b) by 501 days.

(21) Appl. No.: 13/122,182

(22) PCT Filed: Oct. 3, 2008

(86) PCT No.: PCT/DK2008/050245
§ 371 (c)(1),
(2), (4) Date: Jun. 20, 2011

(87) PCT Pub. No.: WO2010/037386
PCT Pub. Date: Apr. 8, 2010

(65) Prior Publication Data
US 2011/0243698 A1 Oct. 6, 2011

(51) Int. Cl.
*B63B 27/00* (2006.01)
*B66C 23/20* (2006.01)
*B66C 19/00* (2006.01)
*B65G 67/60* (2006.01)

(52) U.S. Cl.
CPC .............. *B66C 19/002* (2013.01); *B66C 23/206* (2013.01); *B65G 67/60* (2013.01); *B63B 27/00* (2013.01)
USPC ...................... 414/137.1; 414/139.4; 414/532; 414/539; 198/347.1

(58) Field of Classification Search
USPC .......................... 105/370; 108/57.15; 114/85; 193/35 MD; 198/345.3, 347.1, 538, 198/780; 414/137.1, 137.4, 137.5, 137.7, 414/137.9, 138.1, 138.2, 138.3, 138.5, 414/138.7, 138.9, 139.1, 139.4, 414/140.1–140.5, 141.3, 282, 339, 499, 414/531, 532, 535, 539, 537, 676
See application file for complete search history.

(56) References Cited

U.S. PATENT DOCUMENTS 3,727,776 A * 4/1973 Meeusen .................... 414/140.1
4,096,954 A * 6/1978 Buckner ....................... 414/339
(Continued)

FOREIGN PATENT DOCUMENTS

EP      0 004 280 A2    10/1979
WO     97/31855 A1    9/1997
(Continued)

OTHER PUBLICATIONS

International Search Report: mailed Sep. 7, 2009; PCT/DK2008/050245.

*Primary Examiner* — Gregory Adams
*Assistant Examiner* — Lynn Schwenning
(74) *Attorney, Agent, or Firm* — Flener IP Law; Zareefa Flener

(57) ABSTRACT

A container handling system comprising a crane and a plurality of base elements. The base elements are designed for resting on containers and the crane is designed for being supported on containers or base elements. Containers can be transported on the base elements, which are preferably arranged to form a path. Also cranes, other base element etc. can travel on the paths. Base elements may be provided with rollers or the like and may comprise a turning unit for turning containers etc. about a vertical axis. The system may handle containers stored in a three-dimensional array by arranging base elements on top of containers, lifting containers onto base elements and moving containers across or along base elements to another location in the array. The array may be in a container yard or on a carrier vessel, where the handling system is part of its onboard equipment.

19 Claims, 16 Drawing Sheets

(56) References Cited

U.S. PATENT DOCUMENTS

Figure 1:
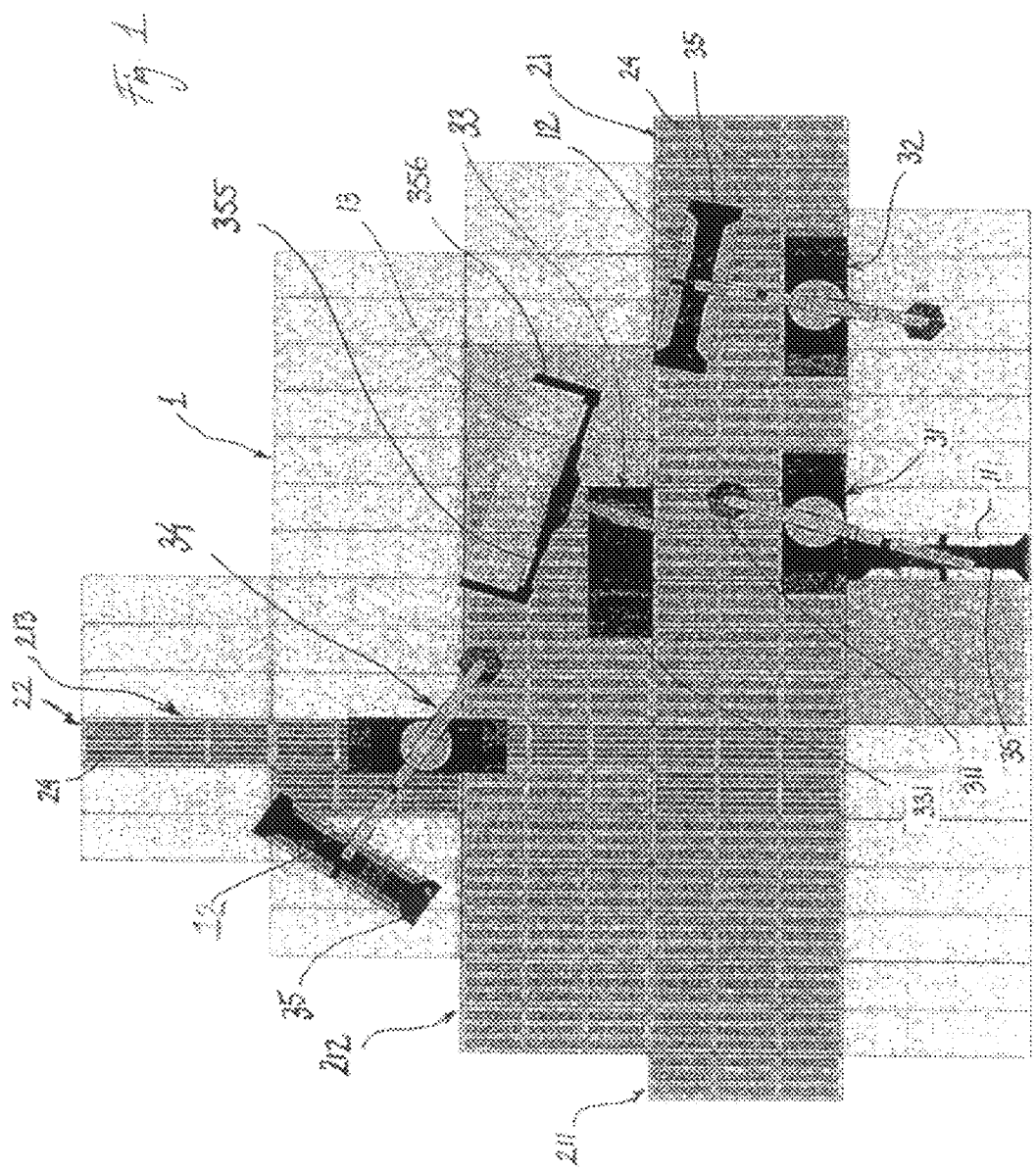

| | | | | |
|---|---|---|---|---|
| 4,128,180 A | * | 12/1978 | Mellious | 414/339 |
| 4,158,416 A | * | 6/1979 | Podesta | 414/140.1 |
| 4,780,033 A | * | 10/1988 | Walda et al. | 410/1 |
| 4,856,961 A | * | 8/1989 | Shell | 414/141.7 |
| 4,938,643 A | * | 7/1990 | Lamb et al. | 410/1 |
| 5,150,781 A | * | 9/1992 | Deisenroth et al. | 198/349.8 |
| 5,289,780 A | * | 3/1994 | Bounds | 104/242 |
| 5,957,055 A | * | 9/1999 | Bauer et al. | 104/35 |
| 6,354,778 B1 | * | 3/2002 | Coslovi et al. | 410/94 |
| 6,902,368 B2 | * | 6/2005 | Hagenzieker et al. | 414/139.9 |
| 2002/0119031 A1 | * | 8/2002 | Karlen | 414/137.1 |
| 2007/0297882 A1 | * | 12/2007 | Villar et al. | 414/333 |
| 2008/0213058 A1 | * | 9/2008 | Simmons et al. | 410/46 |
| 2008/0240900 A1 | * | 10/2008 | Reisenauer | 414/798.5 |

FOREIGN PATENT DOCUMENTS

| | | |
|---|---|---|
| WO | 02/16230 A1 | 2/2002 |
| WO | 02/36423 A1 | 5/2002 |

* cited by examiner

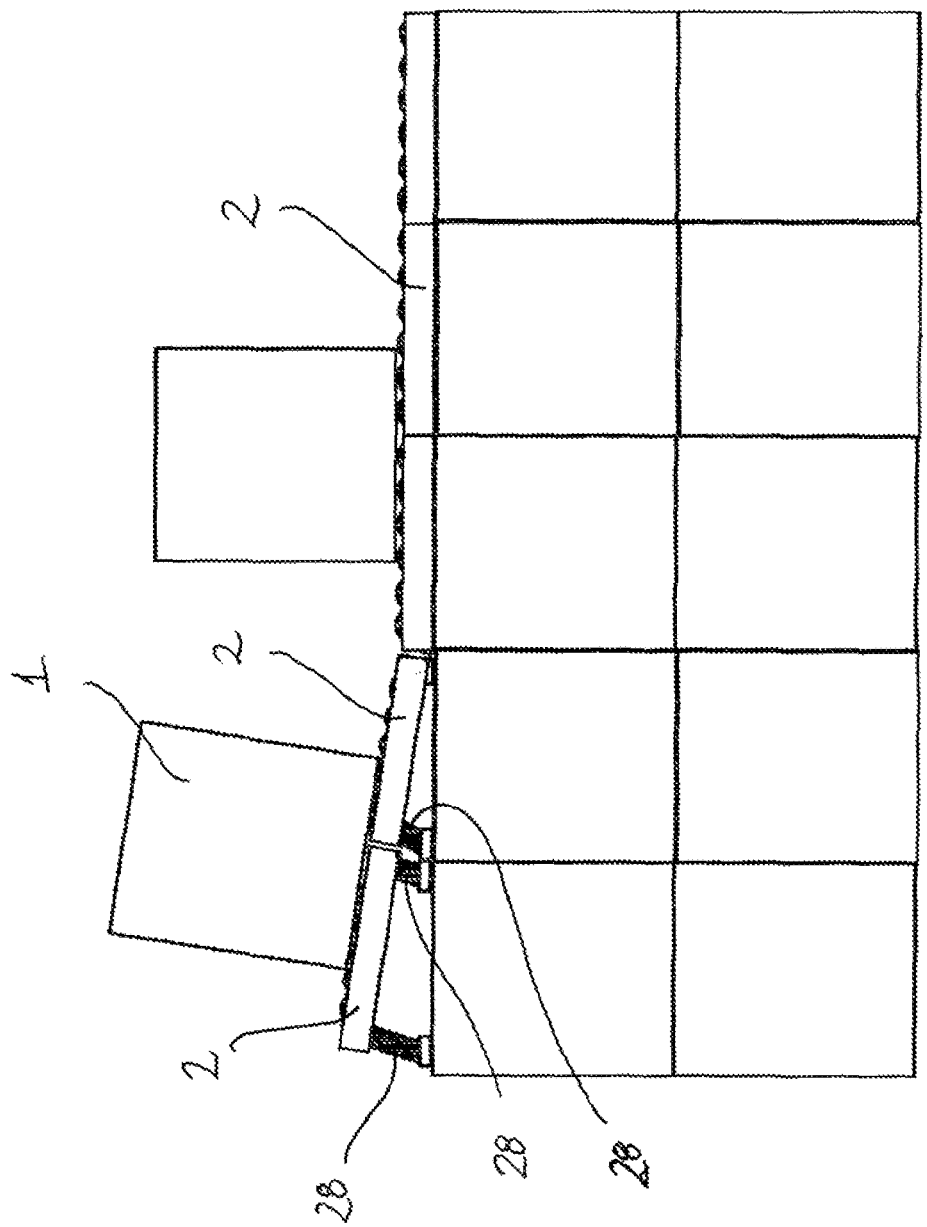

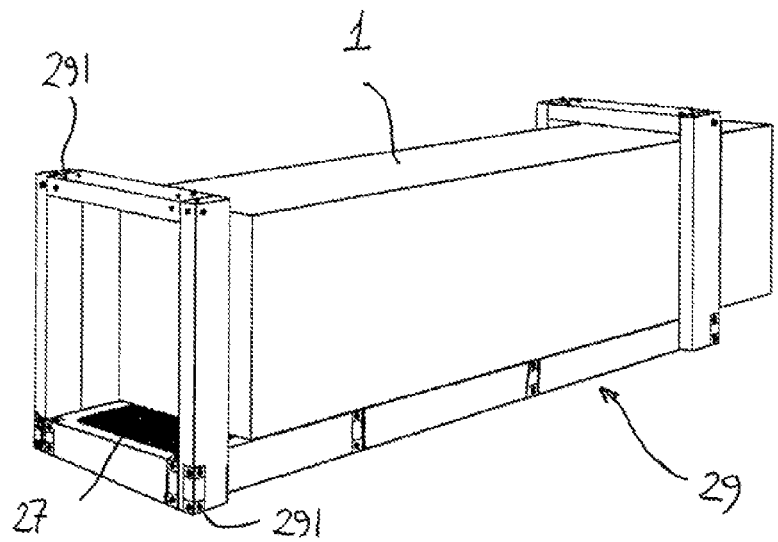
Fig. 6a
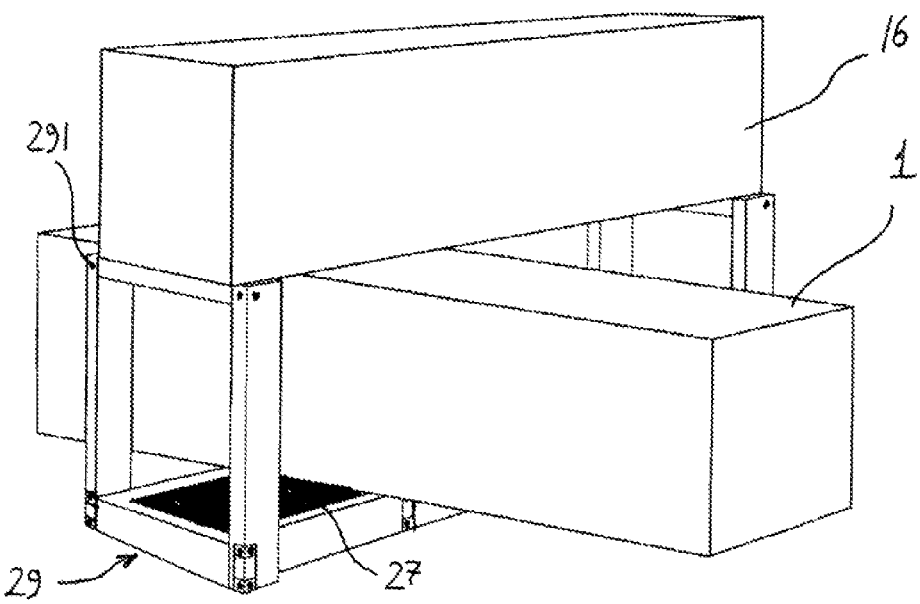
Fig. 6b
Fig. 6

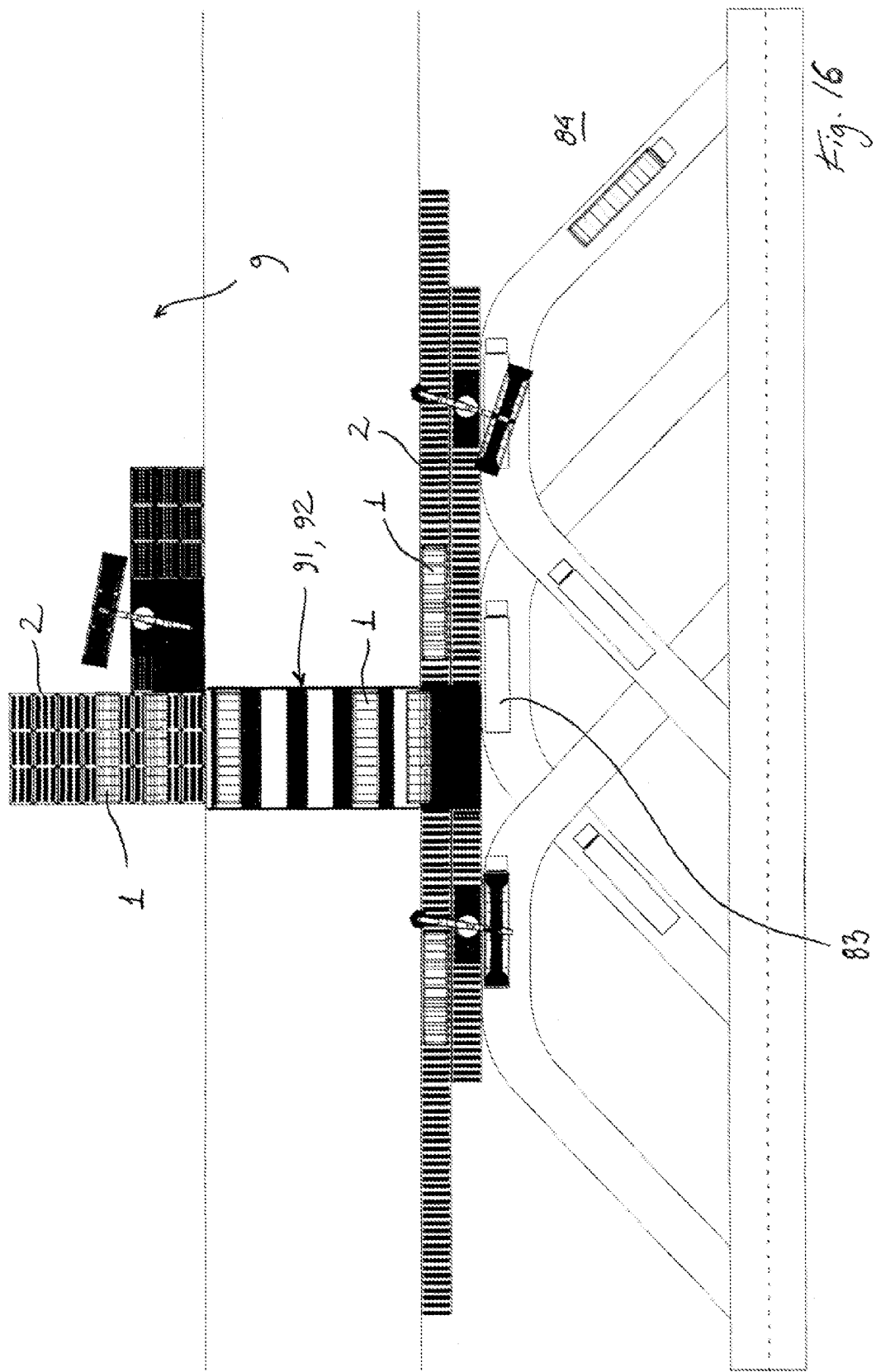

CONTAINER HANDLING SYSTEM COMPRISING A CRANE AND A PLURALITY OF BASE ELEMENTS WHICH CAN BE MOUNTED ON TOP OF CONTAINERS FOR SUPPORTING THE CRANE AND TRANSPORTING THE CONTAINERS

The present invention relates to a container handling system for loading and unloading containers to/from carrier vessels and transferring them to/from other means of transportation, such as trucks or trains, or to/from a container yard.

In most modern ports the loading and unloading of containers from containers carrier vessels is performed by means of cranes situated on the quay. The cranes have booms, which are sufficiently long for them to reach the side of the ship facing away from the quay. Usually they run on rails along the edge of the quay, thus enabling them to pick up and set down containers anywhere on the vessel. Some containers can be transferred directly to/from trucks or trains, possibly with a temporary placement in a waiting position, while others are taken to a container yard, which constitutes a three-dimensional array comprising several rows, columns and layers. The transporting of the containers to and from the container yard and internally therein is usually performed by gantry cranes in combination with trucks, straddle carriers etc. Complex software solutions have been developed to minimise the need for transporting the containers and to avoid having to move one container to reach another.

Such systems are functioning very well in countless ports all over the world, but with the ever increasing amount of goods been transported over still longer distances the number of containers to be handled are rising and it is becoming increasingly difficult to find the necessary space for the container yards. In addition, the running costs of modern container carrier vessels are extremely high and there is therefore a demand for solutions minimising the mooring time. Furthermore, the handling and transporting of containers consumes large amounts of energy, something which has become increasingly unacceptable considering the current energy prices and the concern for the environment.

These problems are solved with a container handling system according to the invention, which comprises a crane and a plurality of base elements, where the base elements are designed for resting on top of containers, where the crane is designed for being supported on one or more containers or base elements, and where containers can be transported on the base elements.

With this system the crane can be placed closely to a container to be lifted, either directly on one or more nearby containers or on one or more nearby base element. The need for large cranes having long booms are thus eliminated. In addition, the large on-shore cranes need a certain distance to each other for being able to operate safely, meaning that they will normally not be able to work on two neighbouring rows of containers at the same time. With the system according to the invention this limitation has been eliminated and it will even be possible for two or more cranes to operate simultaneously on the same row of containers.

The cranes used may be traditional or robotic cranes arranged on top of containers or base elements, but other crane types may also be used. An example of such an alternative crane type is one, which can be used where the array of containers comprises well-like spaces between rows and/or columns. This crane may be arranged so that it rides on the edges of the uppermost containers in the neighbouring rows or columns, thus spanning the well and being able to reach the containers below. This type of crane may also rest on the racks, which are found on most modern container carrier vessel and may additionally serve as a bridge over the well. Stability containers may also be used for supporting such a crane.

Once lifted, the container is placed on a base element (or a spanning crane as described above) and transported to the edge of the array or the side of the vessel. This means that the height of the array in the yard is no longer limited by the height of the crane and that the passages usually left open in the container yard for the gantry cranes is no longer needed. Containers can thus be stored substantially without intermediate spaces over an area of 50 meters by 50 meters or more and the height of the array is limited only by the strength of the lowermost container. Moreover, the large cranes used on the quay for reaching over the vessels can be dispensed with and, particularly on larger vessels, the cranes and base elements of the handling system according to the invention can be part of the on-board equipment. In both cases the use of the handling system according to the invention means, that the containers are not lifted as high in the air as is presently the norm, and this reduced lifting height entails a reduction of the energy consumption.

As the cranes used in the system according to the invention does not have to reach very far, they can be relatively small and thus also relatively cheap. This means that the number of individual cranes may be increased dramatically, which in turn allows for a more flexible handling of the containers. In addition, the time and energy currently used for running the crane cat back and forth is spared, and the small size of the cranes means, that the cranes may operate relatively close to another without colliding. All in all this entails a considerable reduction of the loading and unloading times as well as the energy consumption associated therewith.

The number of cranes and base elements in use may of course be adapted to the particular job, thus adding even further to the flexibility of the system.

In a preferred use of the container handling system, a series of base elements are arranged to form a path, on which cranes, containers, other base element etc. can travel. A container, which has been lifted from its place in the array, either on the vessel or in the yard, is placed on a base element at one end of the path and is then taken along the path to the edge of the array, where it may be transferred directly to the vessel/yard, to other destinations or to other means of transportation.

In case the uppermost level of the array, either on a vessel or in a container yard, has gaps, a base element capable of spanning the gap may be used. It is, however, also possible to fill the gap wholly or partially with stability containers, which are empty containers, possibly strengthened and/or stiffened by an internal frame or the like. It may be advantageous to use stability containers corresponding in dimensions to the dimensions of a standard size container, such as a twenty foot ISO container, but other sizes and shapes can also be imagined.

A path of base elements may also be used for temporarily storing containers until they can be taken to their destination. In the yard, this means that containers to be loaded onto the vessel scheduled to arrive next can be taken out from the array and arranged on the path ready for loading. Similarly, on the vessel, it will be possible to start putting up the containers to be unloaded already when approaching the port. Also, such a buffer path may be used for making it easier to arrange the container in the optimum order for loading or unloading. All measures which contribute to increasing the speed of loading and unloading the vessel.

For the purpose of transporting containers, the base elements may be provided with rollers, belts or the like, which may be passive, simply allowing containers to be pulled or pushed along the path, or active so that the container may be conveyed over the base element. Rollers or wheels are preferred as they are reliable and resistant to wear, but other conveying means such as chains or belts may also be used. Active conveying means may for example be driven by electric motors. The base elements may also comprise brakes for stopping containers travelling thereon. Such brakes may be equipped to accumulate the kinetic energy, which may then for example be used for putting other containers into motion.

If using passive base elements, the crane may be used for pushing or pulling the containers, but a separate driving unit may also be employed. Alternatively, the crane may travel along the path while carrying the container.

Shock absorbers may be provided in the base elements to damper vibrations and compensate for any unevenness in containers and the like travelling thereon. These shock absorbers may be provided in rollers or conveyors, in the lower surface of the base element or in feet or the like used for supporting the base element.

Depending on the construction of the base elements and of the means of propulsion it may be advantageous that the handling system further includes one or more carriages, shoes or the like designed to carry or support containers, cranes etc. on the base elements. While rollers provide only local, linear support, the use of carriages etc. will give a larger area of support. Likewise, if the container is provided with shoes, end caps or the like it can be supported only on at its corners, where it is strongest, thus minimising the risk of the container becoming damaged. Shoes and end caps may be provided with vats or runners.

The carriages may be traditional wheeled trolleys or of more complex construction and may be driven by any chosen means ranging from chain haulage over individual motors to air cushion levitation or electromagnetic propulsion. It is, however, also possible for them to move under the influence of gravity, when travelling on an inclined path.

Another way of provided a larger area of support for the container is to provide the base elements with belt-type conveyors in stead of the rollers.

For some kinds of carriages it may be advantageous or even necessary that the base elements comprise rail or tracks, but such means may also be utilised in systems without carriages. They may then cooperate with projections or recesses on the containers, cranes etc. in order to keep them from running of the base elements. Rails or tracks may even serve as electrical conductors or in other ways contribute to the propulsion.

Regardless how the conveying is achieved it will be advantageous to let two or more sections of the base element operate separately. In this way it is for example possible to transport containers in one direction on one half of the base element and in the other direction on the other half. The number of sections will of course depend on the overall size of the base element.

Independent sections running at different speeds or providing different friction may also be used for changing the direction of a container travelling thereon. By being provide with such independent sections, some or all base elements may thus be made to comprise a turning unit for turning containers and/or cranes about a vertical axis, but similar results may also be achieved by providing a turnplate or the like in the base element.

Above the base elements have been described as used for transporting containers, but it is to be understood that they may also be employed for transporting other items such as other base elements. In this way base elements already laid out may transport the next base element needed for the formation of a path and the path may thus be formed substantially without the use of other equipment. Base elements may even be equipped with driven wheels, belts or the like on their bottom surface so that they may run on top of the containers and come into position by their own force.

To minimize the number of base elements needed and/or to allow flexibility of the design of the path to be traveled by the containers, it is however also possible to continuously lay out new base elements in front of an advancing container. This may be done by a separate base element handling unit or a crane may comprise a lifting tackle for handling the base elements. Base elements may even be transported on top of containers.

The location and operation of the crane or cranes and of the base elements can of course be controlled manually, but it is preferably done by an appropriately programmed computer. Modified versions of the current optimisation software can be used for this purpose, but systems where the individual units, such as cranes etc., operate autonomously, like swarm intelligence, could also be imagined.

The power needed for the transportation of the containers and/or for the operation of the cranes may be supplied via the base elements. For this purpose they can be equipped with electric conduits and connectors for establishing an electrical connection between them and electric outlets for cranes and other equipment. Such electrical wiring may also be employed for transferring kinetic energy accumulated when stopping one container, to another base element where it is used for setting another container into motion. The base elements may, however, also comprise batteries for storing such energy for later use.

A power source, such as a solar energy collector or a windmill, may be arranged on or in connection with one or more base elements and connected directly to the electrical system.

To provide an easy handling and laying of the base elements their length and width advantageously correspond to the length and width of a standard size container, such as a twenty- or forty-foot ISO container. Twenty- and forty-foot containers are the ones most commonly used today, but if other standards becomes widely used at a later time, the size of the base elements should of course be adapted accordingly. By using such standard size base elements, they can be handled using equipment intended for handling containers and the base element may lock on to the corner fittings of the container on which it is placed. Smaller or larger elements may, however, also be used as may a combination of different size elements.

The transfer of containers from one array to another, such as from the side of the vessel to the container yard, or between an array and a means of transportation, such as a truck or train, may be achieved with a traditional crane, which will minimise the need for new investments. It is, however, preferred to use, a distribution unit having at least one arm equipped for transporting containers, where the arm(s) may be arranged to interconnect a position from where containers are to be moved with a position of destination. Such a distribution unit may also be used for moving containers from one part of a container yard to another or from one level in an array to another. Base elements, cranes etc. could of course also be moved via the distribution unit. One end of the arm or arms will then be arranged at a height corresponding substantially to the position from where the container should be moved, while the other end or the end of the other arm should be at level with the position of destination. In a preferred embodiment the distribution unit has two arms arranged in continuation of each other and attached pivotally to the frame at the ends where they meet. Each arm is equipped with a conveyor resembling an escalator. When used for transferring containers directly from the side of a container carrier vessel to a container yard on shore, the free end of one arm is arranged closely to the side of the vessel at level with the containers to be unloaded, while the free end of the other is arranged closely to the edge of the yard at level with the uppermost container of the array. The point of attachment of the arms should preferably be at a level between the level of the free ends of the two arms, when arranged in this manner. Containers to be unloaded are now transferred to the ship-side arm, possibly aided by an on-board crane, and the escalator takes them to the other arm, which again takes them to the container yard. When the level of unloading from the vessel is located higher than the level of the yard, the escalators may be driven wholly or partially by gravity, leading to a reduction of the energy consumption. An even more pronounced contribution to the reduction of the energy consumption, however, lays in the fact that the containers are only lifted or lowered as much as they need to, whereas they have formerly often been brought down to ground level only to be lifted back up to the uppermost level of the yard array when arriving there.

Of course, some containers have to be lowered to ground level for being transferred to trucks or trains or vice versa, and the distribution unit may therefore further comprise an elevator. Means for transferring containers to the elevator is preferably provided where the two arms meet, but further escalators may also be provided serving the same purpose as the elevator.

Figure 2:
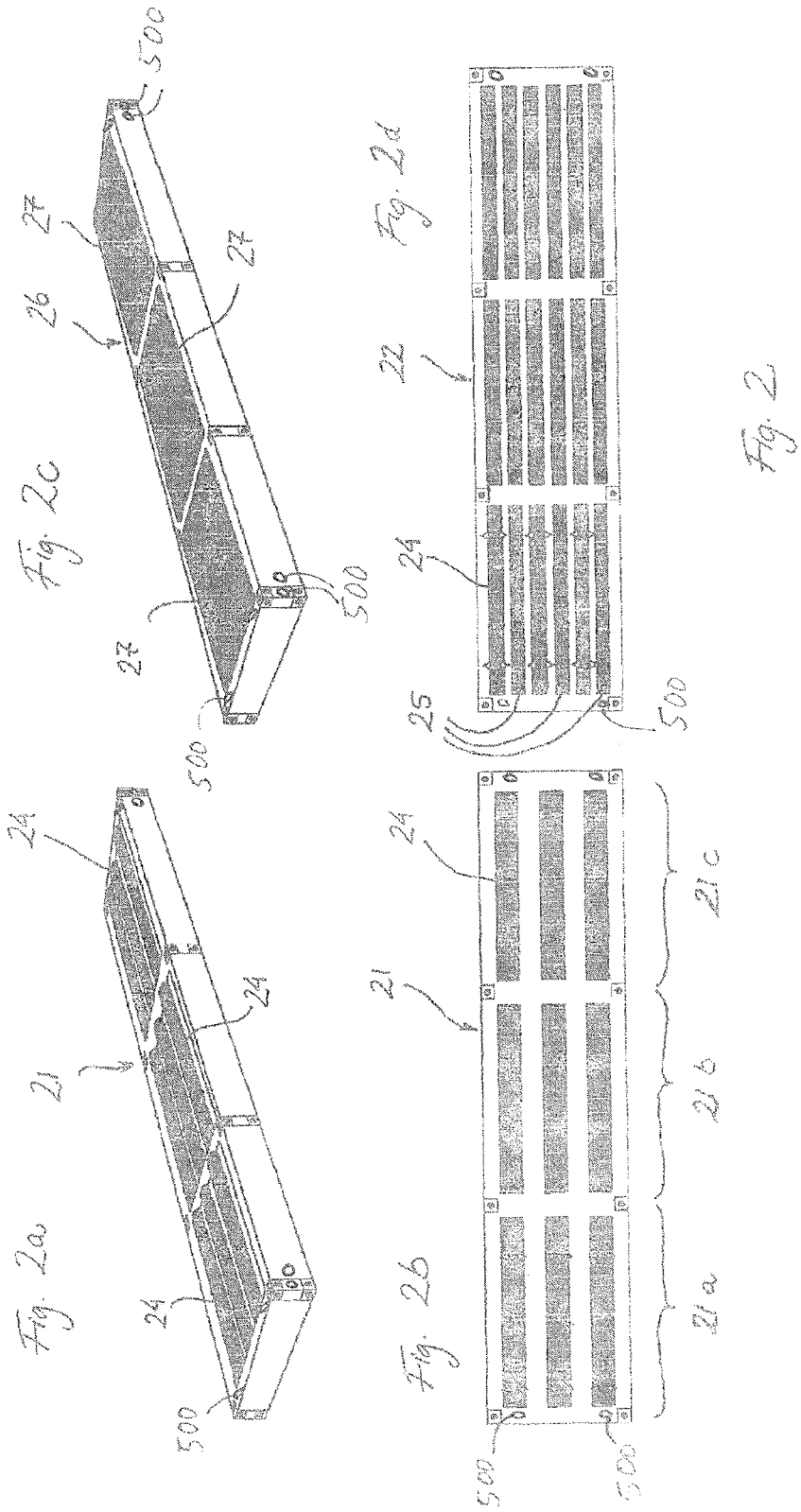
Figure 3:
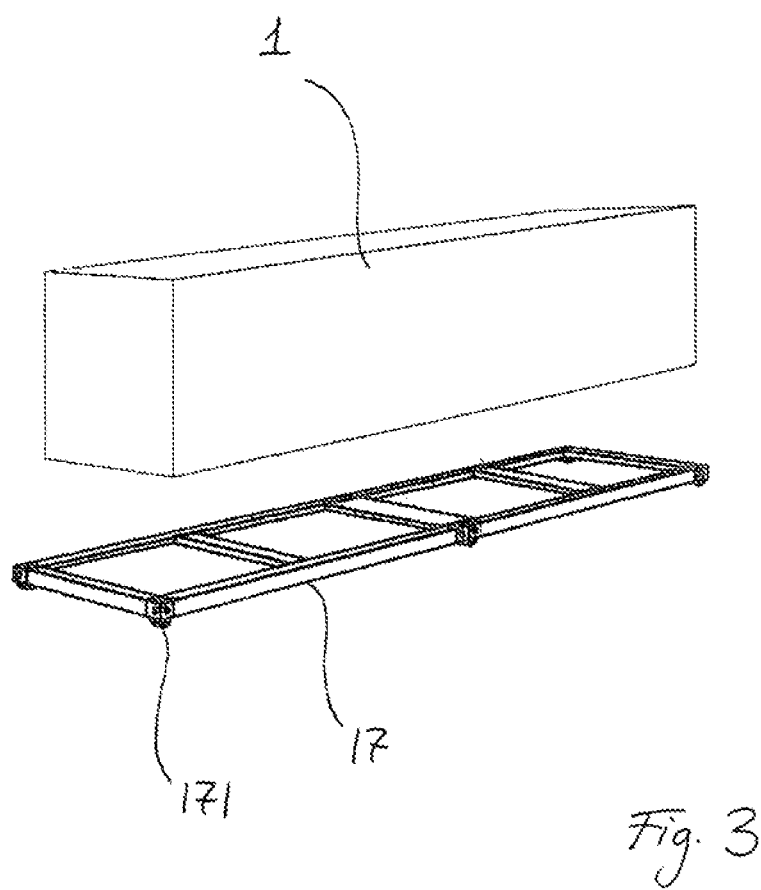
Figure 4:
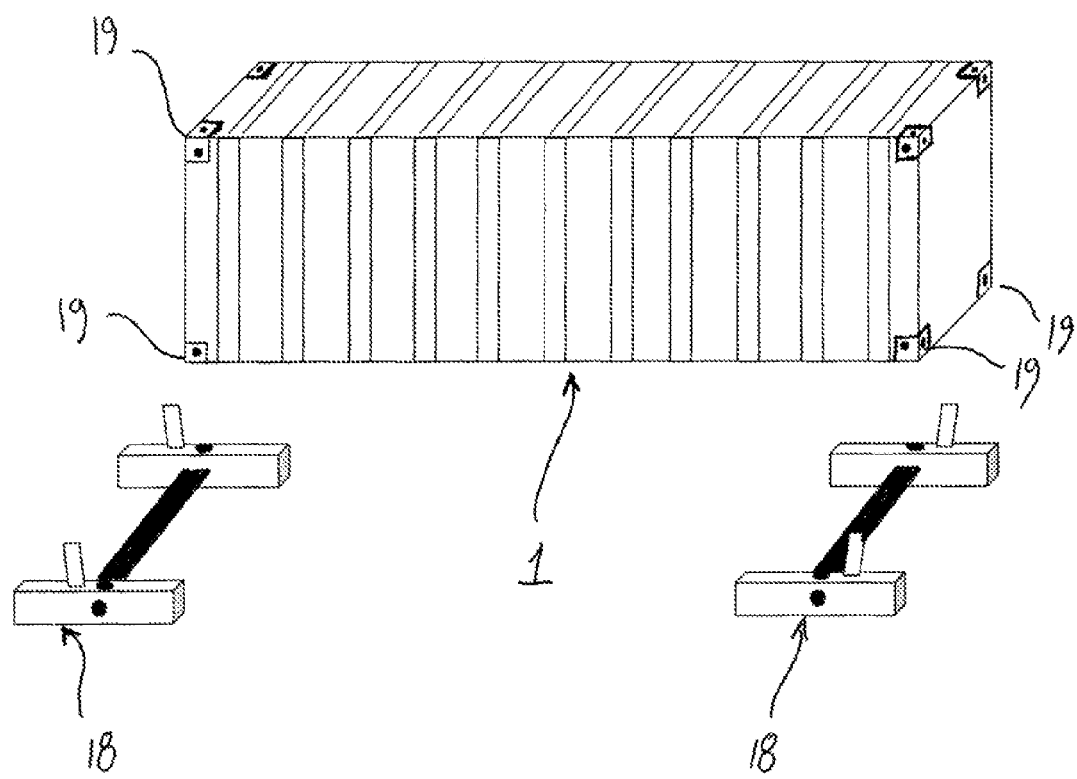
Figure 7:
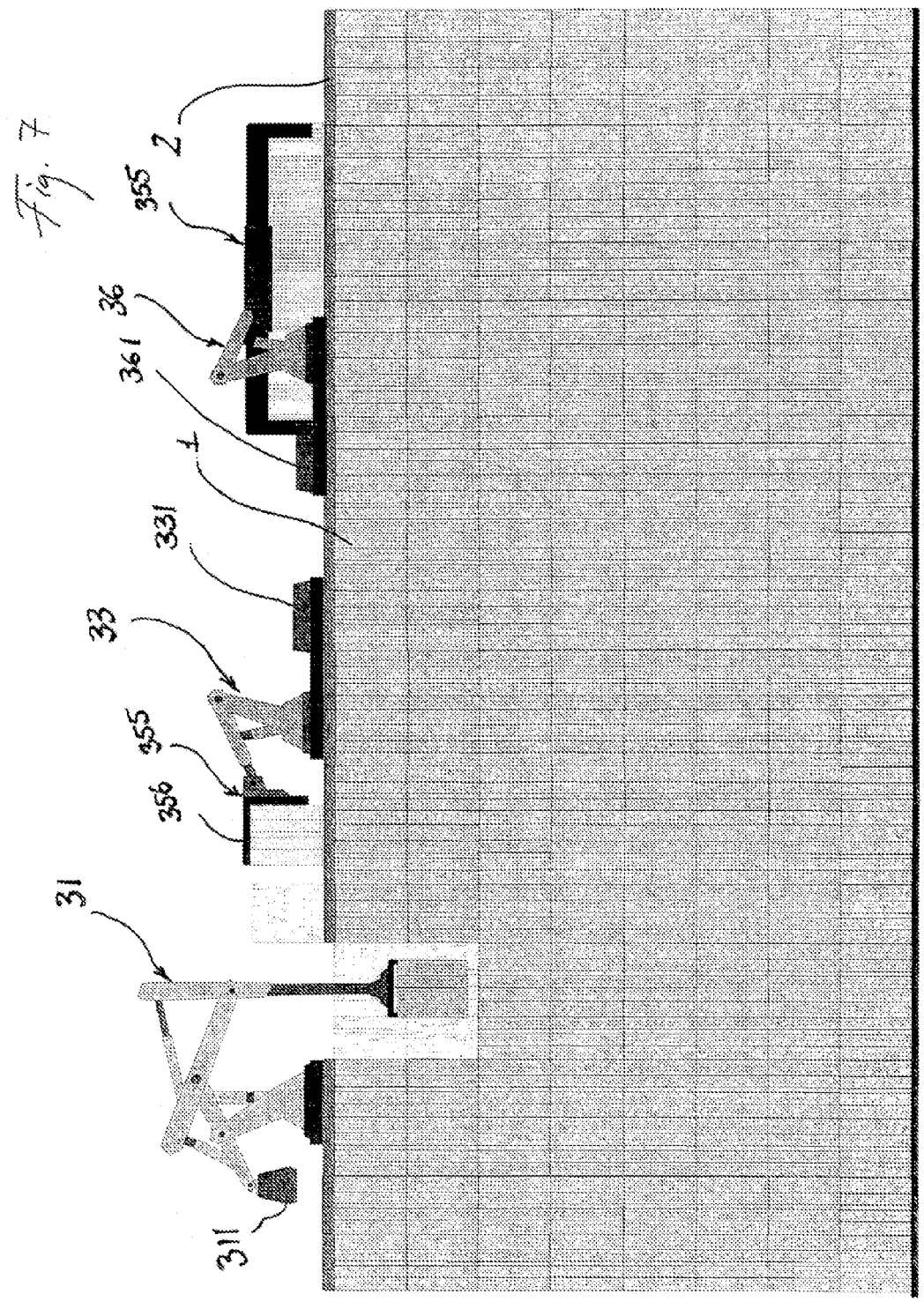
Figure 8:
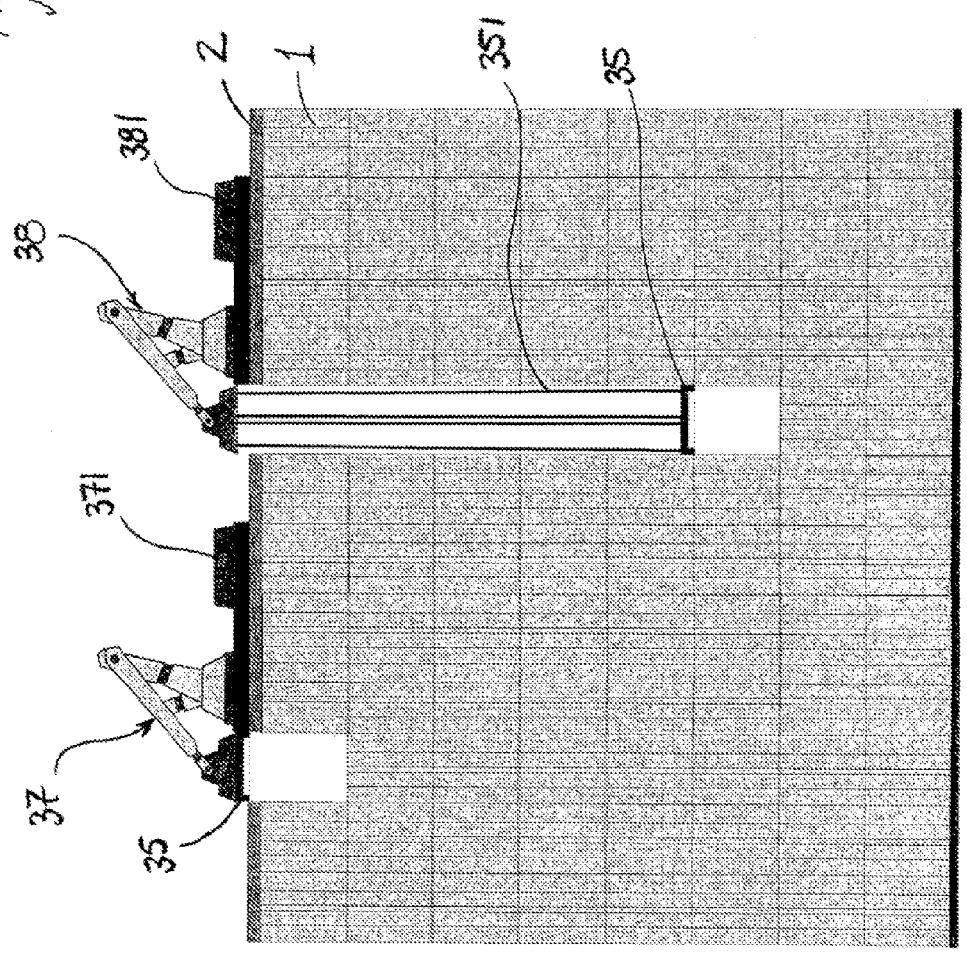
Figure 9:
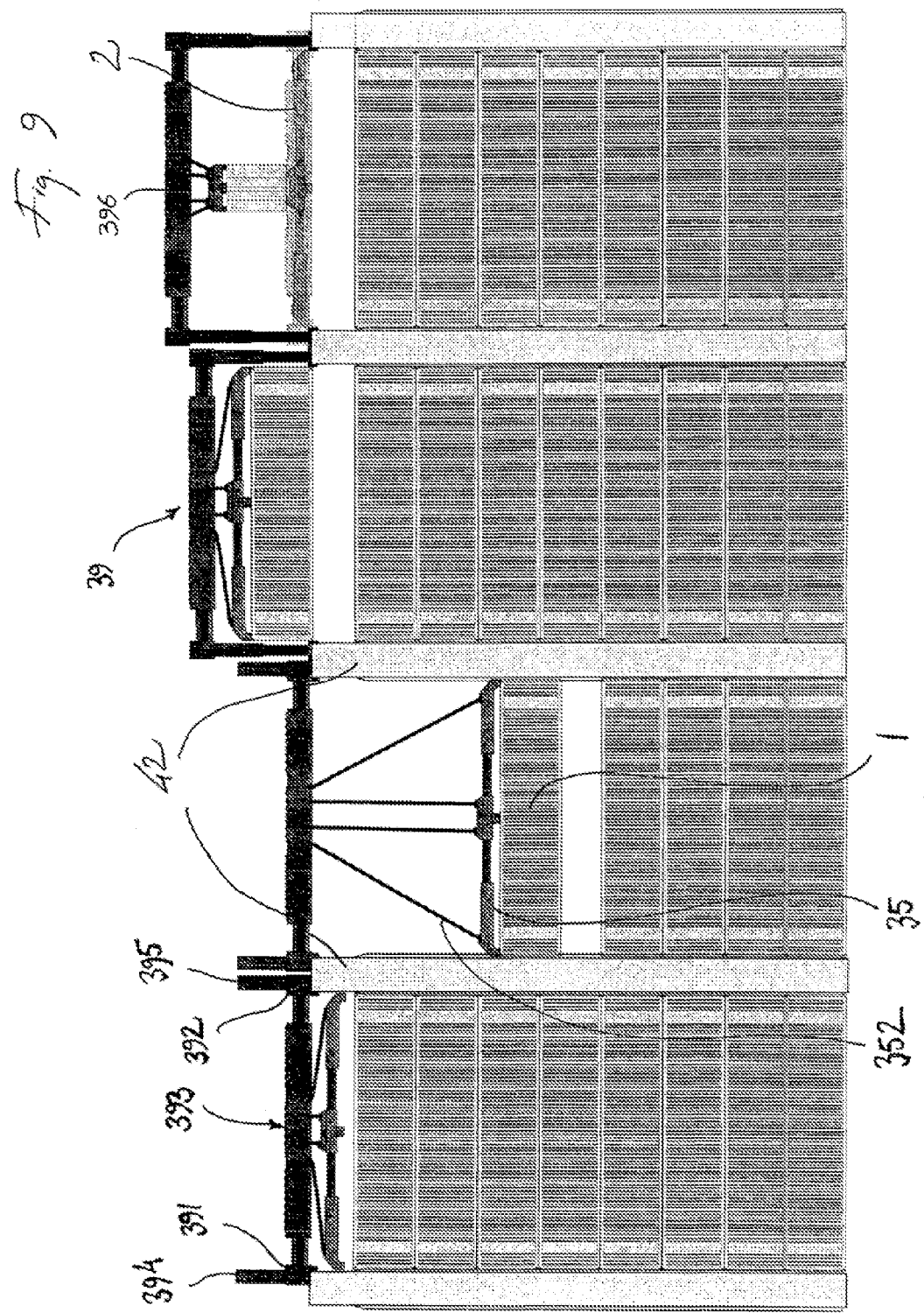
Figure 10:
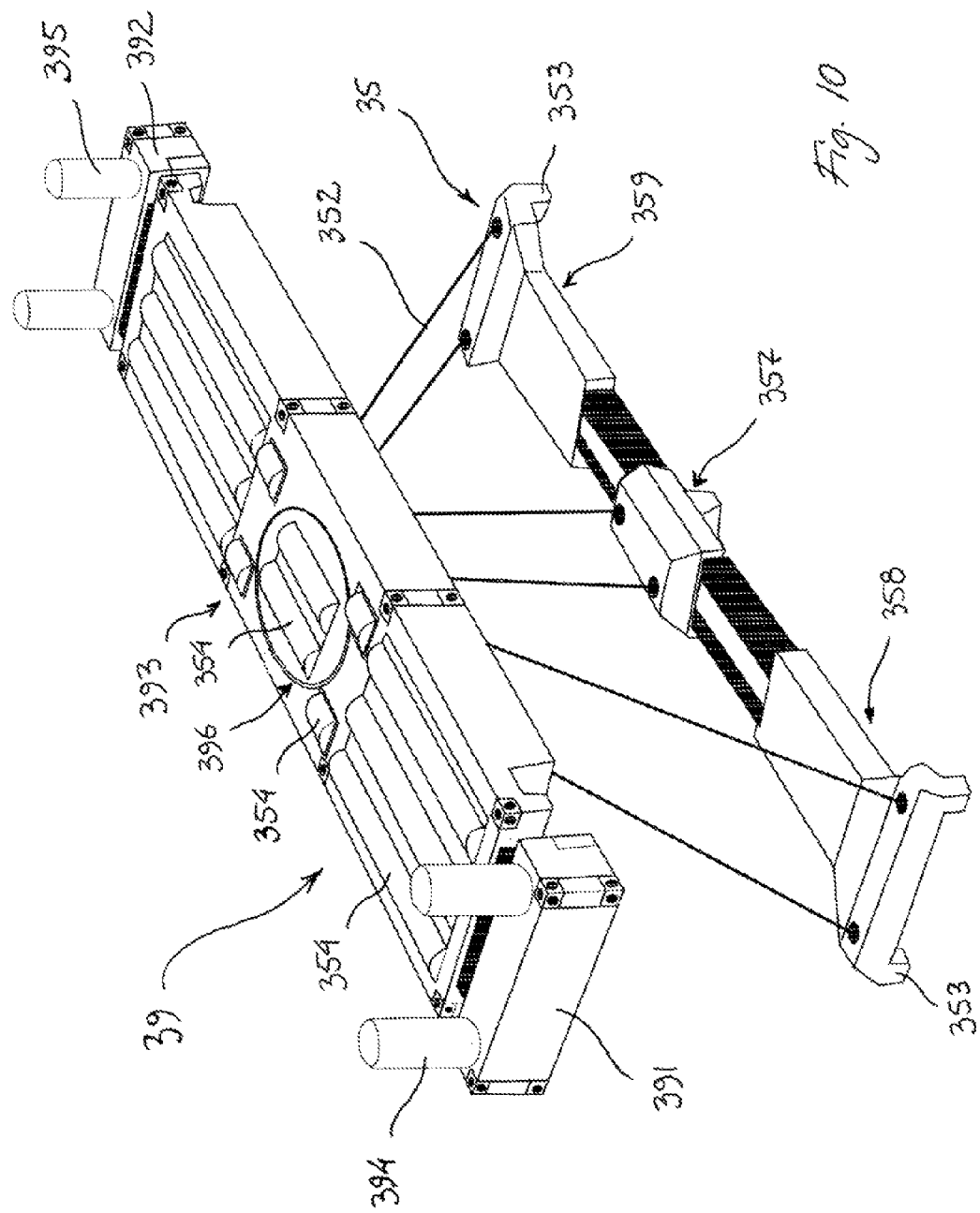
Figure 11:
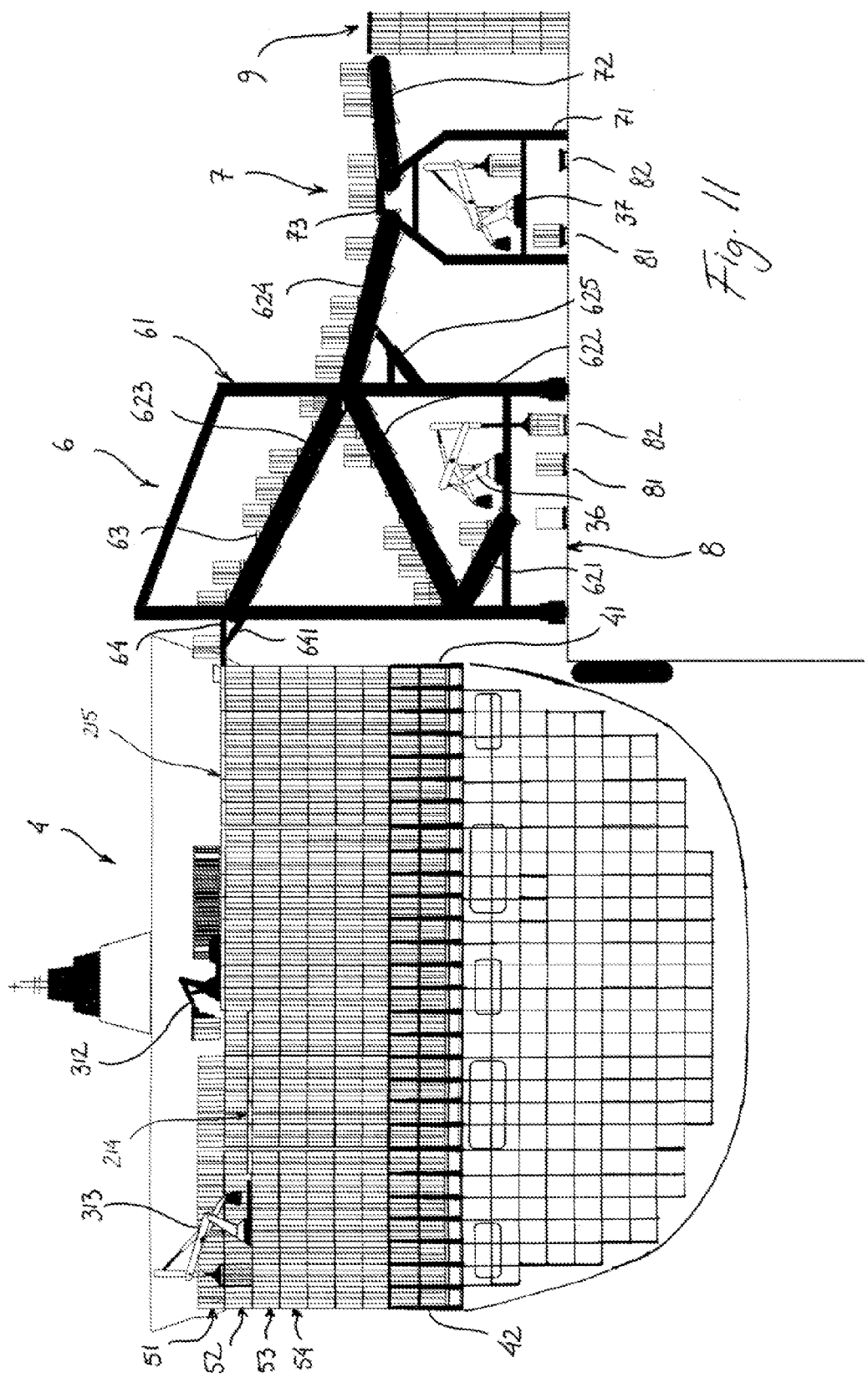
Figure 12:
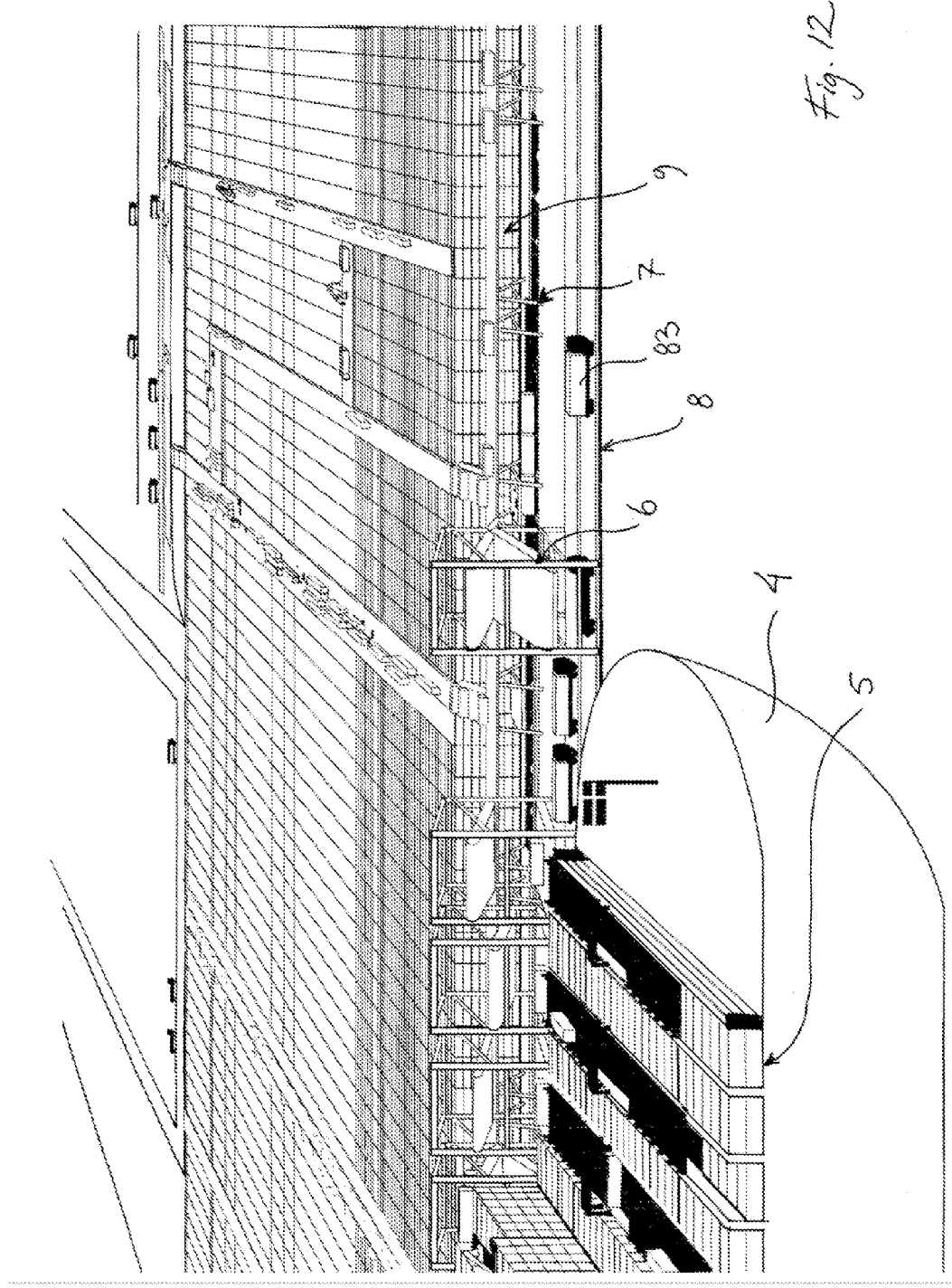
Figure 13:
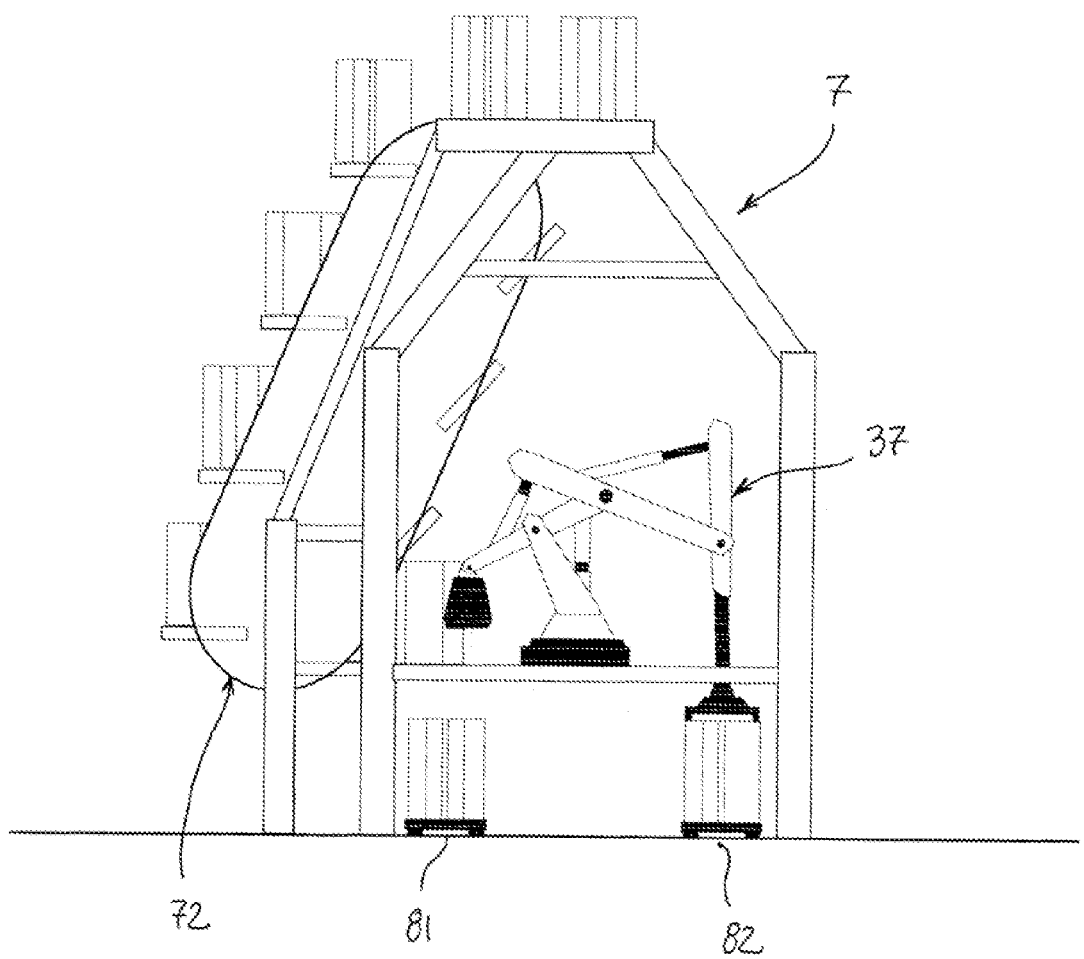
Figure 14:
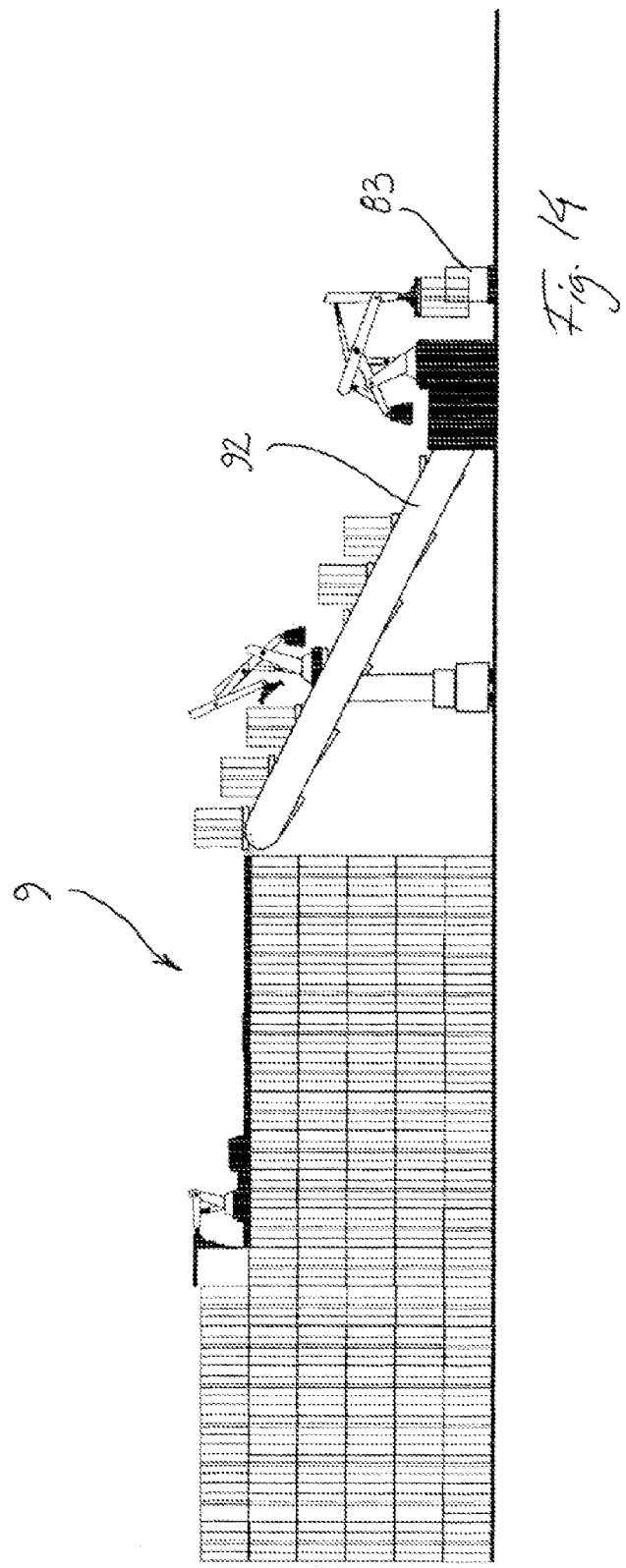
Figure 15:
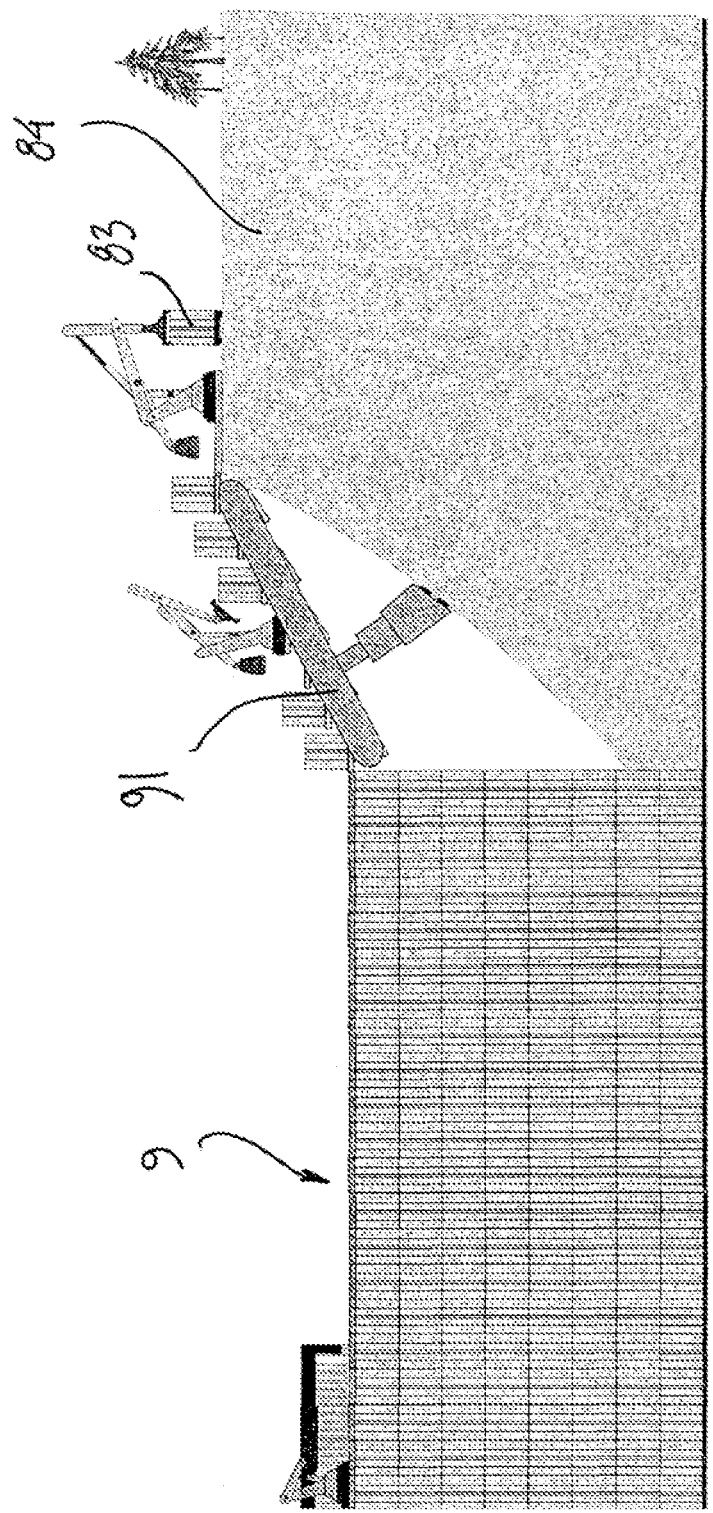

In the following the invention will be described in closer detail with reference to preferred embodiments shown in the drawing. In the drawing:

FIG. 1 is a view from above of an array of containers, where individual containers are handled by a system according to the invention, FIG. 2 shows three different embodiments of base elements in a perspective view and seen from above, FIG. 3 shows a container carriage in a perspective view, FIG. 4 shows a set of shoes for supporting a container in a perspective view, FIG. 5 shows a path with elevated base elements seen from the side, FIG. 6 shows a tunnel element in a perspective view and with containers in two different orientations, FIG. 7 is a first view from the side of an array of containers being managed according to the invention, FIG. 8 is a second view from the side of an array of containers being managed according to the invention, FIG. 9 is a view from the side of an array of containers arranged within a stability rack and being managed according to the invention, FIG. 10 is a perspective view of a rack crane, FIG. 11 is a view from the side of a container carrier vessel being unloaded according to the invention, FIG. 12 is a perspective view of a container vessel docked at a quay during unloading by means of a system according to the invention, FIG. 13 shows a distribution unit seen from the side, FIG. 14 shows a conveyor for transferring containers from a container yard to ground level, FIG. 15 shows a conveyor for transferring containers from an elevated ground level to a container yard, and FIG. 16 corresponds to any of the FIGS. 14 and 15 seen from above.

An array of containers 1 seen from above is shown in FIG. 1. Base elements 21,22 have been laid out on top of some of the containers, so that paths 211, 212 and 213 have been formed, path 213 being perpendicular to the others. A crane 31 is situated on path 211, reaching over a neighbouring container 11 to be lifted. Other cranes 32,33 have already lifted containers 12,13, while crane 34 holds a base element 23 intended for extending the path 213.

All cranes are equipped with lifting tackles 35 capable of griping and holding containers as well as base elements. Such tackles are known within this field of technology. The tackles used today is intended only for engaging the container from above, but they could fairly easily be modified so that they may be used also for engaging the containers from the side. The tackle can be adjustable in a telescopic manner so as to allow one and the same tackle to be used for lifting containers of different sizes.

The containers lifted by cranes 32 and 33 can now be put down on paths 211 and 212, respectively. As may be seen the base elements 21,22 has a length, which allows the crane to put down the container on the same base elements, on which it is itself supported. This allows containers to pass other cranes working on the path, container 12 for example passing crane 31 when travelling left in the drawing, or even other containers (not shown) travelling at the other side of the path. It is, however, also possible to lay out the base elements end-to-end as in path 213 so as to form more narrow paths.

Once the cranes 31,32,33 are done handling containers, which can be reached from their current positions, they can be moved to another position on any of the paths 211,212,213 or new paths can be laid out to enable them to reach containers in other parts of the array. For this purpose the cranes should preferably be capable of moving along the paths either by their own force or driven by the base elements.

Here, a very simple system is shown, but it is to be understood, that the number cranes and the complexity of the paths will depend on the particular job to the undertaken by the system.

The cranes 31,32,33,34 can be driven manually, but it is preferred to use a robotic type crane, which run more or less autonomously. Likewise, the controlling of which crane to go where and which paths to be laid is advantageously performed by a computer, possibly even with cranes, base elements etc. possessing a degree autonomy.

FIG. 1 shows two different types of base elements 21,22, which are shown in more detail in FIGS. 2*a* and 2*b* and FIG. 2*d*, respectively. Both types are provided with driven rollers 24, by means of which the containers and other equipment such as other base elements can be transported perpendicularly to the length axis of the base element as illustrated by the small arrows. The base element shown in FIG. 2*d* further has build-in conveyor belts 25, which may be raised above the uppermost level of the rollers and used for transporting containers etc. along the length axis of the base element.

The base element 26 in FIG. 2*c* corresponds to that in FIG. 2*a* except for being equipped with belt conveyors 27 instead of rollers and is intended for transporting containers etc. perpendicularly to the length axis of the base element.

Depending on the intended use of the base elements it is of course also possible to arrange rollers and conveyor belts in a different orientation or to use other driving means such as for example toothed belts, sprockets or series of wheels. Each base element may be provided with a motor for setting rollers etc. in motion or the base elements may be interconnected by toothed wheels or the like to allow motion to be transferred from a common motor to the individual base elements. A system with a common motor will minimise the need for maintenance and low-tech solutions are generally preferred, as they will generally be usable with most types of containers and provide operational reliability.

As may be seen both in FIG. 1 and FIG. 2 each base element comprises three sections of rollers. This means that each of the paths 211, 212 may effectively function as three separate paths. As an example the uppermost roller sections of the base elements in path 211 may transport containers to the left on the drawing, while the lowermost roller sections are standing still, supporting the cranes 31,32.

It may also be advantageous to provide the base elements with brakes, which can be used for blocking roller sections, when they function as supports. It is, however, preferred that the cranes have their own means for attachment to the base elements.

Base elements having multiple sections as described above may also be used for turning containers.

If the container is resting with its length axis parallel with the length axis of the base element the rollers in one end section 21a may simply be run in one direction, whereas the rollers in the opposite end section 21c is run in the opposite direction. Neighbouring base elements may possibly contribute to the turning.

If, on the other hand, the container is resting with its length axis perpendicularly to the length axis of the base element the turning may be achieved using base element of the types shown in FIG. 2d. Here, the conveyor belts 25 will be operated in much the same manner as described for the rollers above, but the operation will of course include several base elements.

Other turning units such as turntables may, however, also be used as will be explained later and it is to be understood that such system, as well as the rollers and conveyor belts above, could be designed to turn the containers over any chosen angle. A turntable will preferably occupy the middle section of the base element.

In the above the use of base elements with active driving means has been described, but it is to be understood, that it is also possible to use a separate driving unit, such as a tractor, for pulling or pushing containers along the paths or that the cranes may serve this purpose, either functioning as a tractor or running along the path while carrying the containers. Containers may also be arranged on carriages designed to travel along the paths or be provided with shoes, end caps or the like, so as to avoid the containers resting directly on the rollers. An example of such a carriage 17 having wheels 171 is shown in FIG. 3 and an example of a set of shoes 18 is shown in FIG. 4. Both the carriage 17 and the shoes 18 are intended to come into engagement with the corner fittings 19 of a container 1.

Regardless of the whether the base elements have active driving means or not, the containers may be set into motion by putting them down on a inclining path, so that they gain kinetic energy when sliding down. This is preferably achieved by simply inclining the first few base elements of the path as described above, either by providing them with legs 28 that can be adjusted in height as shown in FIG. 5 or by arranging them on top of a wedge-shape element. Alternatively, it is imaginable to provided special base elements which are themselves wedge-shaped.

Also, other kinds of specialized base elements, such as tunnel-shaped element for providing a shortcut through the array of containers, may also be imagined. A possible embodiment of such a tunnel element 29 is shown in FIG. 6, where a container 1 is travelling along the length axis of the tunnel element 29 in FIG. 6a and across its length axis in FIG. 6b. In FIG. 6b a second container 16 has been arranged on top of the tunnel element 29. Here the tunnel element is shown with belt conveyors 27 corresponding to the base element shown in FIG. 2c, but rollers etc. may of course also be used. The tunnel element is provided with locking means 291 at the corners correspond to the corner fittings used on containers and intended to come into engagement with these.

All kinds of base elements may be provided with electrical wiring for supplying energy to rollers and conveyor belts and possibly also for cranes etc. Each base element should then be provided with connectors for interconnecting them to each other, the design of which are known to person skilled in the art. Other functionalities such as means of communication, a liquid supply etc. may also be provided in the base elements. Such features will, however, increase the cost of the elements and the complexity of the laying thereof.

Furthermore, the base elements may be equipped with suspension systems (not shown) capable of dampening impact movements caused by the placing of containers and/or vibrations caused by containers, cranes etc. moving on top of them. This is to protect the containers below.

FIG. 1 shows two different types of cranes, where cranes 31, 32 and 34 are of a first type and crane 33 is of second type. FIG. 7 shows these two types of cranes seen from the side while operating on top of an array of containers 1. The crane 31 of the first type is designed for lifting containers situated at the same level as the crane or a few levels above or below it. It reaches two to three container widths to the side. The other type of crane 33 and 36 is designed for turning containers or transferring them from one path to another, but is only capable of lifting them enough to make them come free of the base elements. Cranes of this type may also be used for lifting containers on and off carriages or shoes as described above. As may be seen, the cranes 33 and 36 of the second type are provided with lifting tackles 355 engaging the containers from the side and having an arm 356 extending along each of the top end edges of the container for stability. This allows easier handling, but tackles engaging from above may also be used. In addition the standard type lifting tackle 35 may also be turned, so that it engages the container from the side. Both types of cranes are provided with counterweights 311,331 to prevent them from tipping over when lifting heavy containers.

A third type of crane 37 and 38 is shown in FIG. 8. These cranes are designed for performing deep lifts, when containers have to be brought up from levels deep within the array. For this purpose these cranes are provided with tackles 35 hung from cables 351, so that the tackle can be brought from the position shown on crane 37 to the one shown on crane 38 by unwinding the cables. The mechanism needed for this operation is well-known from conventional type cranes. These cranes too are provided with counterweights 371,381 to keep them from tipping over.

A fourth type of crane 39 is shown in FIGS. 9 and 10. This crane is primarily intended for use on the stability rack 42, which are found at deck level on larger container vessels. As may be seen from FIG. 9, where the same crane 39 is shown in four different states of operation, this crane is substantially plate-shaped and designed to rest with its two ends on two neighbouring rack elements spanning the space between them. For this purpose the crane is preferably telescopic so that the end elements 391, 392 may be retracted and extended in relation to the centre part 393. In the initial position the crane is simply resting on top of the rack elements as shown to the far left in FIG. 9. If a container 1 is to be lifted from a level deep within the stability rack 42, the lifting tackle 35 is lowered and raised by means of cables 352 in a conventional manner as depicted in the second section of the rack in FIG. 9. Once the container has been lifted to a position immediately underneath the crane 39, the entire cranes elevates itself by displacement of the end elements 391, 392 on columns 394, 395 as shown in the third section of FIG. 9. Here, the columns 394,395 are depicted as being telescopic, which con-tributes to the elevation, but they may of course also be of constant height. The container is then finally turned as shown in the fourth section to the far right in FIG. 9. This is preferably done by turning the section 396 of the centre part 393, which is carrying the lifting tackle 35. This turning will cause the ends of the container to project over neighbouring rows of the array of container, where base elements 2 may be provided for receiving it.

It is of course also possible to use another crane (not shown) for receiving the container from the rack crane 39, in which case it will not be necessary to turn the container by means of the rack crane.

FIG. 10 shows the rack crane in a perspective view. As may be seen the upper side of the crane is provided with rollers 354 in the same way as the base elements 21,22 described above and may thus form part of a path for transporting containers. In this way the crane 39 may serve both for lifting containers and as bridge over the space between racks. Here, the midmost section 396 is in the form of a turntable and may thus turn both the lifting tackle of the crane and containers travelling on top of the crane.

Cranes of the type shown in FIGS. 9 and 10 may also rest on the edges of neighbouring containers in stead of on the rack. Moreover, they may be provided with wheels or the like (not shown) to enable them to travel along the racks or container edges.

The lifting tackle 35 shown in FIG. 10 is a preferred embodiment, which can also advantageously be used on the other types of cranes. As may be seen the tackle 35 comprises a centre element 357 and two end elements 358,359. The end elements are provided with fingers 353 for holding on the container and may preferably be displaced in relation to the centre element so as to open and close the lifting tackle. The fingers are designed for engaging the corner fittings of standard type containers.

The system according to the invention when used for unloading a container carrier vessel 4 is shown in FIGS. 11 and 12. Here, paths 214,215 of base elements 2 have been laid out on two different levels 51,52 within the array 5 of containers 1. Containers originating from levels 51 and 52 are put on the path 215 using crane 312, while crane 313 lifts containers from levels 51, 52, 53 and 54 and puts them on the path 214. At the end of path 214 the crane 312 transfers the containers from path 214 to path 215, which takes the containers to the side 41 of the vessel. From here they are transferred to an on-shore handling system 6, possible by means of an on-board crane (not shown).

In FIG. 11 the paths 214 and 215 have been depicted as being laid out on two different rows of the array 5 in the same way as paths 211 and 212 in FIG. 1, but they could of course also have been laid on the same row.

The on-shore handling system may in principle be a standard type cantilever crane or the like, but in FIG. 11 the on-shore handling of the containers are performed by distribution units 6,7. The distribution units 6,7 are situated on the quay 8 and capable of running along the side of the vessel 4, so that they may operate anywhere along the length axis of the vessel and even travel to other vessels (not shown) docking further down along the quay. The distribution units may have wheels for travelling directly on the quay or be equipped for running on rails. It is, however, also possible to use a stationary distribution units, which extend along the length of the quay. In this case the conveyors and other equipment may be displaceable in relation to the frame in a direction along the quay.

Both distribution units 6,7 comprise a frame 61,71 and one or more escalator-like conveyors 62,72 for conveying containers. Each step or shelf 63,73 of the conveyors corresponds substantially in size to the size of a standard forty-foot ISO container, but other dimensions may also be employed depending on demands.

In the larger distribution unit 6 the ends of most of the conveyors 621,622,623 are fixed in the frame 61, so that they may be raised or lowered depending on the level at which containers 1 are unloaded from the vessel 4. A fourth conveyor 624 is a cantilever type arm fixed at one end to the frame, while the other end is free. A support arm 625 is used for supporting the cantilever arm.

In the smaller distribution unit 7, which is primarily intended for transferring containers from the larger one to a yard 9, the conveyor 72 is also a cantilever arm type.

The larger distribution unit operating closest to the vessel also has a shelf-like bridge structure 64 intended for spanning the gap between the side of the vessel and the conveyors. This structure is supported by an arm 641, which is preferably provided with a dampening mechanism for compensating for possible vessel movements.

In the embodiment shown the distribution units 6,7 each straddles over a railway 81 and a road 82 so that trains and trucks may pass underneath it. Containers can be loaded onto or lifted off trucks and trains by means of the cranes 36,37. Crane 36 transfers the containers from/to the lowermost conveyor 621, whereas crane 37 transfers to/from the platform 73 or to conveyor 624, which can be lowered for the purpose. The distribution units may, however, also include an elevator (not shown) for lowering and lifting containers or the cranes 36,37 could be located at a higher level, in which case they would be equipped to reach further down. Cranes suitable for performing this operation are known to the skilled person and will therefore not be discussed here.

For bringing containers down to ground level the cantilever arm 72 of the smaller distribution unit 7 may also be lowered as depicted in FIG. 13.

Depending on local demands the conveyors may be arranged different on the respective distribution unit. As an example, it may be advantageous to have two cantilever arms on the smaller unit 7, corresponding to the conveyor 624 being located on the smaller unit 6, in which case the larger unit may be made simpler. Alternatively, the units may be designed to work closer together in which case the intermediate arm 624 may possibly be eliminated altogether. Moreover, the bridge structure 64 projecting from the larger distribution unit 6 towards the vessel may be replaced by a cantilever type arm, which will increase the flexibility of the system.

Preferably, it should be possible to put the conveyors in neutral so that containers etc. travelling downwards are transported only by the force of gravity acting on them. Moreover, energy from the pull of gravity on the containers travelling downwards may be accumulated and used for lifting other containers or used in base elements. Alternatively, escalators going downwards may be replaced by chutes allowing the containers to simply slide down or the shelves of the escalators may be retracted or turned, so that the escalator may function as a chute. The maximum angle of inclination of such a chute is approximately 30 degrees to avoid damages on the goods inside the container.

The system with two neighbouring distribution units connecting the vessel 4 directly to the container yard 9 allows containers to transported between them without being lowered to ground level. This no only entails a saving of energy by also minimises the traffic at ground level.

If permitted by the landscape in which the container yard 9 is located, containers may be offloaded from trucks or trains 83 at a level above the uppermost level of the container yard as depicted in FIG. 14. A conveyor 91 of the same type as described above may then be utilised for transferring the containers to the yard, using the force of gravity to drive the escalator. If, however, the landscape does not include the necessary elevations 84, a conveyor 92 may be arranged as depicted in FIG. 15. Both of these conveyors 91,92 thus serve as alternatives to the more complex distribution units 6,7.

Arrangements as those described above with reference to FIGS. 9 and 10 could look as depicted in FIG. 16, when seen from above.

The container yard is preferably also managed by a container handling system as described and depicted above with reference to handling of containers on board the vessel.

When cranes are operating on top of the array of containers there is no longer a need for streets within the yard and containers can be arranged side by side over rather large, uninterrupted areas. This saves considerable amounts of space and thus enables a much more effective use of the yard area and a considerable increase of capacity.

The uppermost level of the array may advantageously be provided with solar panels, which could advantageously be made in the same size as the base elements or even be integrated in these. They should, however, be easily moveable to allow access to the containers below. Alternatively, small-scale windmills could be placed at intervals on top of the container yards. In this way it will be possible to provide energy for the cranes or the system could be connected to the public distribution network. Solar panels and the like may also be used on the array of containers on the vessels, but in this case the harsh weather conditions at sea, vessel movements etc. should be taken into consideration.

In the above the uppermost levels of the arrays of containers both on the vessel and in the yard has been described and shown as being relatively uniform. In practice, however, there will be circumstances where the storing of containers can not be optimised in this sense and where optimal paths can therefore not be laid on the existing array or where it will be difficult to find a suitable position for a crane. This could be solved by moving other containers to achieve a more suitable array, but it is preferred to in stead fill gaps in the array with so-called stability containers. A stability container is a container, which is effectively empty and which has been reinforced with a grid of steel rods or the like.

Power supply units, electrical connection boxes, control equipment etc. may also be held in specialised containers, which will make it easy to move them with in the array depending on demands and even to quickly load then onto a vessel upon arrival at a port. Such a container may even hold a battery, which is charged by energy produced by solar panels on the containers.

In the above the cranes have been described as being supported on base elements. It is, however, to be understood that they may also travel directly on top of the array of containers along side the paths formed by the base elements. This may for example be advantageous when building the paths, but it will also free space on the paths, which may in stead be used for transporting containers. Similarly, it is to be understood that many types of cranes will be usable both on the base elements and on top of the containers and that cranes may operate simultaneously in both places.

The cranes described in this and depicted in the drawing is designed for lifting only a single container at a time, but it is to be understood that they may be modified to lifting two or more containers at a time.

The invention claimed is:

1. A container handling system comprising;
   a crane;
   a plurality of base elements; and
   a three-dimensional array of standard size containers, each container having corner fittings,
      wherein a first side of the base elements is configured to be removably mounted to a top side of a container using the container corner fittings and a second side of the base elements is configured to support at least one of other containers or the crane,
      wherein a series of base elements removably mounted on the containers form at least one path on which at least one unit chosen from the group consisting of cranes, containers and other base elements can travel to transport the other containers to a different location in the array of containers, and
      wherein the crane is configured to travel directly on too of the containers or on the second side of the base elements.

2. A container handling system according to claim 1, where one or more base elements are provided with rollers or the like allowing other containers to be pulled, pushed or conveyed over the base element.

3. A container handling system according to claim 1, further including one or more carriages, shoes designed to carry or support other containers and/or cranes on the second side of the base elements.

4. A container handling system according to claim 1, wherein base elements comprise rail or tracks.

5. A container handling system according to claim 1, wherein a base element comprises a turning unit capable of turning containers, cranes and/or other base elements about a vertical axis.

6. A container handling system according to claim 1, further comprising at least one base element handling unit.

7. A container handling system according to claim 1, where the crane comprises a base element lifting tackle.

8. A container handling system according to claim 1, further comprising a computer programmed to control the location and operation of the crane or cranes, the base elements, the containers and of carriages or shoes if any.

9. A container handling system according to claim 1, where at least some of the base elements comprise electric conduits and connectors adapted for establishing an electrical connection between base elements and electric outlets for cranes and other equipment.

10. A container handling system according to claim 1, where a power source is arranged on or in connection with one or more base elements.

11. A container handling system according to claim 1, where the length and width of a base element correspond to the length and width of a standard size container.

12. A container handling system according to claim 1, further comprising a distribution unit having at least one arm equipped to transport containers, where the arm(s) may be arranged to interconnect a position from where containers are to be moved with a position of destination.

13. A container handling system according to claim 12, where the arm(s) comprises a conveyor capable of transporting containers, cranes and base elements.

14. A container handling system according to claim 12, where the distribution unit further comprises an elevator capable of lowering or lifting containers from/to the arm(s) or a chute.

15. A container yard organized with a container handling system according to claim 1, where containers are stored substantially without intermediate spaces over an area of 50 meters by 50 meters or more.

16. A method of handling containers stored in a three-dimensional array comprising several rows, columns and layers, said method comprising the steps of:
- arranging base elements on top of containers,
- lifting containers onto base elements using cranes supported on one or more base elements or containers,
- moving containers across or along base elements to a different location in the array.

17. A method according to claim 16 used for loading and unloading containers to/from a carrier vessel, where the cranes, base elements and carriages, if any, are part of the vessels on-board equipment and where containers are moved to and/or from the side of the vessel.

18. A method according to claim 16, where an on-shore distribution unit is used for transferring containers between the side of a vessel, the edge of a container yard and other means of transportation.

19. A method according to claim 16, where containers are moved within a container yard, particularly to and/or from the exterior edge thereof.

* * * * *